United States Patent Office 3,037,973
Patented June 5, 1962

3,037,973
TETRACYCLINE RECOVERY PROCESS
Gasper Sarcona, Bellerose, N.Y., and Joseph A. Kardys, Groton, Conn., assignors to Chas. Pfizer & Co., Inc., Brooklyn, N.Y., a corporation of Delaware
No Drawing. Filed June 16, 1960, Ser. No. 36,487
2 Claims. (Cl. 260—96.5)

This invention relates to a process for the recovery and purification of tetracycline, and, more specifically, pertains to a process for the conversion of tetracycline base and organic-base salts thereof to tetracycline urea compound, from which tetracycline of remarkably high purity may be recovered.

Tetracycline can be prepared by at least two different methods. In the first method, chlortetracycline is subjected to catalytic reduction to remove chlorine and produce tetracycline. In the second method, tetracycline is formed directly by the growth of selected micro-organisms under aerobic conditions in suitable nutrient media. It is often necessary to recover tetracycline from dilute aqueous solutions which may contain a variety of organic and inorganic impurities, particularly, when it is produced by fermentation.

Various procedures have been suggested for the recovery of tetracycline from dilute aqueous mixtures, for example, it has been proposed that the tetracycline be precipitated as an insoluble form from aqueous or organic solvent solutions. Thus, it has been proposed to precipitate tetracycline in isoelectric form from such solutions or as a slightly soluble salt of an organic amine, such as, a fatty alkalamine salt or a quaternary ammonium salt followed by recovery of the antibiotic as the free base or as an acid salt by appropriate pH adjustment and precipitation from an aqueous solution. It has also been proposed to precipitate tetracycline as a metal complex and then recover the tetracycline from the said metal complex.

It has now been found that excellent recoveries of high quality tetracycline can easily, readily and economically be obtained from various types of impure solutions of the antibiotic. However, the process of this invention is especially useful when applied during the recovery of tetracycline from fermentation broths. Such broths may have a bio-potency of about 500 units per milliliter or more and contain a variety of organic and inorganic impurities. When the refining includes the new process, as much as 70% or even more of the tetracycline activity can be recovered from fermentation broths. The order of the various steps can be varied considerably as will be recognized and appreciated by those skilled in the art.

It must be pointed out that the process of this invention is applicable to the recovery of tetracycline from any impure solutions thereof. However, for convenience, the process will be discussed with respect to its recovery from fermentation broths.

If a clarified aqueous tetracycline solution or broth is made alkaline, preferably in the presence of an organic base, the tetracycline base precipitates and may be removed by any suitable means, including centrifugation or filtration. In the case of low-potency broths, precipitation in the presence of an organic base is desirable in order to form the poorly soluble tetracycline-organic base salt and thereby permit recovery of substantially all tetracycline activity. In working up high potency broths, the addition of an organic base may be omitted without experiencing undue loss of tetracycline activity.

The valuable process of this invention involves forming a solution of tetracycline base and/or tetracycline organic-base salt, derived, for example, from fermentation broths as described above, in an aqueous solvent containing a water-miscible alcohol, such as methanol, by suitable pH adjustment. Urea, within certain critical limits, is also incorporated in this solution, and the pH of the solution adjusted to about 4-5 to precipitate tetracycline-urea compound of exceptionally high purity. The tetracycline may be recovered from the urea compound as the free base or as an acid addition salt by known procedures. The new process provides substantially improved yields in the precipitation of the tetracycline urea compound, as well as in the subsequent conversion to high purity tetracycline base or acid addition salt.

In carrying out the recovery of tetracycline from fermentation broth, the whole broth containing the mycelium is acidified, usually to a pH of about 2.0 to 2.2, with a mineral acid such as sulfuric acid, to solubilize all the tetracycline activity present. The suspended solids are then removed, for example, by centrifugation or filtration, and the clear filtrate is adjusted to a pH of about 8-9 with a base such as sodium hydroxide to precipitate the tetracycline base. This precipitation is preferably conducted in the presence of a filter aid, such as diatomaceous earth, suitably at a level of about 5% w./v.

It should be noted that upon basifying fermentation broths of the tetracycline antibiotics, a certain amount of the antibiotic may be precipitated as a metal derivative, due primarily to the presence in the fermentation media used of certain polyvalent metallic ions, particularly calcium and magnesium. The amount of tetracycline-metal salt which precipitates varies with the acid used for the acidification of the tetracycline-containing solution or broth. When sulfuric acid is used, appreciable portions of the polyvalent metal ions, e.g. calcium and magnesium, present in the fermentation medium are removed as their insoluble sulfates, and, hence, the tetracycline base and/or tetracycline-organic base subsequently precipitated is substantially free of metal salts. When hydrochloric acid is used for acidification, the tetracycline or tetracycline-organic base salt which precipitates upon basifying the system is found to be present to some extent as metal salts. The chlorides of calcium and magnesium are relatively water-soluble and are not precipitated on acidification of the broth. For this reason, it is preferred to acidify the broth with sulfuric acid prior to filtration of the mycelium.

In order to obtain maximum recovery of tetracycline, the basic precipitation is advantageously conducted in the presence of an organic base of the type described by Blase in U.S. Patent 2,873,276. As mentioned above, when the fermentation broth is of low potency, that is, when the activity of the broth is less than about 3000 u./ml., the organic base is preferably added in order to realize maximum recovery of tetracycline activity by precipitation of at least a portion in the form of the poorly soluble organic base salt. In working up broths of higher potency, the addition of an organic base, while not necessary, is desirable. A wide variety of different organic bases, including primary and secondary organic alkylamines, quaternary ammonium compounds, cyclic amines and primary phenylalkyl amines can be used to precipitate tetracycline as a poorly water-soluble tetracycline organic-base salt. These classes of organic bases include, for example, primary alkylamines having from 6 to 12 carbon atoms in a straight or branched chain; secondary alkylamines in which each of the two alkyl groups attached to the nitrogen has between 6 and 9 carbon atoms; primary phenylalkyl amines in which the alkyl group has 1 to 3 carbon atoms; quaternary ammonium compounds in which from 1 to 2 of the alkyl groups attached to the nitrogen contain from 8 to 18 carbon atoms and in which the remaining alkyl groups attached to the nitrogen have from 1 to 3 carbon atoms; analogous quaternary ammonium compounds wherein one of the long chain alkyl groups is replaced by a phenylalkyl moiety of the type described above; and N,N'-diphenyl alkyl ethylenediamines. Organic bases illustrative of the various classes described are: n-octylamines, n-decylamine, n-dodecylamine, di-heptylamine, di-2-ethylhexylamine, di-n-hexylamine, benzylamine, phenethylamine, α-methyl benzylamine, octadecyl-trimethyl ammonium chloride, dodecyl-trimethyl ammonium chloride, cetyl-trimethyl ammonium bromide, cetyl-dimethyl benzyl ammonium chloride, dodecyl-diethyl benzyl ammonium chloride, Onyx BTC 824 (a mixed alkyl-dimethyl benzyl ammonium chloride), t-butyl benzyl-trimethyl ammonium chloride, and N,N'-di-(t-butyl) benzyl ethylenediamine.

Although diamines, cyclic amines and aralkyl amines are operable, the preferred organic bases are the primary and secondary alkyl amines containing from 6 to 18 carbon atoms and quaternary trimethyl ammonium compounds containing one alkyl group of 8 to 18 carbon atoms of the type described above. It is particularly preferred to use an alkyltrimethylammonium halide, such as Arquad T or Arquad C–50, which are available from Armour and Company, and which contain octadecyltrimethylammonium chloride and dodecyltrimethylammonium chloride, respectively, as the main ingredients.

One particularly useful basic organic precipitant for tetracycline antibiotic fermentation broths is Arquad C, which is available as a 50% by weight solution in isopropanol ("Arquad C–50") or a 33% aqueous solution. This material consists of a technical mixture averaging about 47% dodecyl trimethyl ammonium chloride together with 8% octyl-, 9% decyl-, 18% tetradecyl-, 8% hexadecyl-, 5% octadecyl-, and 5% octadecenyl-trimethyl ammonium chlorides. The small amount of isopropanol introduced when that solution is used does not interfere seriously with the efficiency of precipitation of the tetracycline antibiotic salts. The amount of such base used should be controlled in order to avoid precipitation of the organic impurities as gummy solids which create mechanical difficulties in subsequent steps and inconsistent yields. A rate of about 500 ml. of Arquad T or Arquad C per kilogram of tetracycline usually satisfies the requirements of yield and filtration characteristics. Other precipitants are also effective in approximately this proportion, although the lower molecular-weight compounds may be used in somewhat smaller amounts, and the higher molecular-weight materials in somewhat larger amounts.

The tetracycline-containing precipitates obtained by the above procedures are suitably isolated from the antibiotic-depleted liquor by filtration or centrifugation.

Tetracycline base, or a tetracycline-organic base salt, prepared, for example, as described above, may be converted to tetracycline urea compound of exceptionally high purity and in excellent yield by the process of the present invention. The solid, which may be wet or dry, is dissolved in aqueous methanol containing from about 10 to about 35% by volume of methanol. In order to effect solution, the mixture should be acidified to an aquilibrium pH of from about 1 to about 1.8, suitably by addition of an acid such as sulfuric acid. We have discovered that when the solvent contains at least about 10% methanol, dramatic improvements in the purity of the subsequently precipitated tetracycline urea are obtained. Thus, for example, if the process is conducted in plain water, the product obtained often contains about 1% ash, or more. Such ash levels present a purification problem far greater than might be assumed, and ash reduction in later purification steps is achieved only at the drastic expense of recovery yield. The presence of at least about 10% methanol, however, provides up to 90% or more reduction in the ash level of the resulting urea compound, and thereby results in substantial improvement in overall yield to acceptable finished antibiotic. It has been found that the presence of more than about 35% methanol in the aqueous solvent is undesirable, since it may prevent the substantially quantitative recovery of the tetracycline urea compound from solution.

The use of methanol at the indicated levels confers other important processing advantages as well. It has been found to promote the more rapid solution of the tetracycline base or organic-base salt in the acidified solution, and it eliminates the serious foaming problem usually encountered where plain water is employed. As a result, processing time and attendant antibiotic decomposition losses are greatly reduced.

It will of course be appreciated that if the tetracycline base or organic-base salt introduced to the aqueous methanol are already wet with water from a previous process step, appropriate allowance for such water is to be made in formulating the aqueous alcohol solvent, so as to provide the desired 10–35% methanol content in the solvent.

While the proportion of tetracycline to aqueous methanol may be varied over a wide range, it has been found that if the concentration is less than about 30,000 units of tetracycline activity per ml., precipitation of the tetracycline-urea compound in the subsequent step may be difficult and incomplete. Concentrations of about 45,000 units per ml. and higher have given consistently good recoveries of tetracycline, and will generally be preferred. (One gram of tetracycline corresponds to one million units activity.)

If the tetracycline base or organic-base salt was originally precipitated in the presence of a filter aid such as diatomaceous earth, as earlier described, the acidified tetracycline solution in aqueous methanol will naturally contain suspended matter, which may now be removed by filtration or centrifugation. This step will also separate any other insoluble impurities which may be present. If desired, this separation may be preceded by treatment with an insoluble purifying agent, such as activated carbon, which may then be removed concurrently with the filter aid.

According to the new process of this invention, urea is incorporated in the aqueous alcohol solution at a level of from about 50 to about 75 equivalents per equivalent of tetracycline (corresponding to about 15 to 22 lbs. urea per billion units of tetracycline activity). It has been found that this unusually high level of urea confers important advantages in product purity and recovery yield. If substantially less than 50 equivalents of urea are employed, the resulting tetracycline urea compound will usually be dark in color and high in ash, and it will be precipitated in appreciably lower yield. Furthermore, the subsequent processing to finished antibiotic of acceptable purity will entail serious tetracycline losses. Each of these effects is proportionately magnified at urea levels progressively lower than the minimum of about 50 equivalents. Within the range of about 50–75 equivalents, golden yellow tetracycline urea compound of high purity and low ash is consistently recovered in excellent yield. Of course, urea levels even higher than 75 equivalents may be employed, but ordinarily any slight advantage thereby obtained is not justified by the added cost.

The point of introduction of the urea into the aqueous alcohol may be varied somewhat without appreciable effect on the results. It may, for example, be incorporated in the aqueous methanol prior to the addition of the tetracycline base or organic-base salt. Alternatively, it may be added after the tetracycline has been dissolved, either before or after any filtration that may be employed to remove filter aid or any activated carbon optionally introduced. In some cases it may be more convenient to add the urea in several divided portions at these various points.

During the time that the tetracycline is in contact with the acidified aqueous alcohol, the temperature should be maintained below about 27° C. in order to prevent decomposition of tetracycline to anhydrotetracycline. In order to minimize losses through epimerization and thus realize maximum recovery of tetracycline, the entire process should be conducted with a minimum of delay. However, if extended delays are anticipated it is a reasonable precaution to conduct the processing below room temperature, say at about 5-15° C., to minimize decomposition.

In order to recover tetracycline from the solution, the pH is now raised to about 4.0 to 5.0 with, for example, sodium hydroxide to precipitate the urea compound in good yield and high quality. At pH values less than about 4.0 the urea compound precipitates slowly and in poor yields. At pH values greater than about 5.0, the precipitated urea compound is generally off-color. The tetracycline urea compound which separates is recovered, suitably by filtration or centrifuging.

Tetracycline of high purity may be recovered from the urea compound by known procedures. Recovery as the free base may, for example, be accomplished by dissolving the urea-compound in a water:ethyl Cellosolve:butanol (83:10:7) system adjusted to about pH 1.6 with hydrochloric acid, decolorizing with charcoal, and then raising the pH of the resulting solution to 3.3-3.5 with, for example, 25% sodium hydroxide.

The hydrochloride salt may be obtained by dissolving the free base in a mixture of ethyl Cellosolve: n-butanol (1:2) adjusted to pH 7.8-8.0 with triethylamine. The solution may then be decolorized, and the filtrate adjusted to pH 1.6-1.7 with hydrochloric acid at 25° C. The mixture is seeded if necessary, allowed to granulate for several hours, filtered, washed with butanol, acetone and dried at 55-58° C. in vacuo.

In each of these steps high quality product is obtained in excellent yield, owing to the superior quality of the tetracycline urea compound provided by the new process.

Various optional modifications of the process steps described may be made if desired. For example a metal ferrocyanide, such as sodium, potassium, calcium or magnesium ferrocyanide may be introduced during processing to facilitate removal of impurities by precipitation. This may, for example, be done prior to the mycelium filtration, in the case of recovery from fermentation broths. Alternatively, a ferrocyanide may be added to the filtered broth prior to the precipitation of the tetracycline base or organic-base salt or to the acidified aqueous alcohol solution prior to removal of filter aid or activated carbon. Levels of about 50-70 grams (anhydrous basis) per kilogram of tetracycline are appropriate prior to mycelium filtration, or about 30-50 grams at the other points cited. While such treatment is sometimes beneficial, it is not essential.

Similarly, increased recovery may be realized by judicious recycle operations. A preferred embodiment of the recycle operation comprises extracting the combined filtrates from the tetracycline-urea compound and the tetracycline base separation at pH about 9.5 with n-butanol and filtering if necessary. The butanol layer is separated and the butanol extraction repeated once again. Approximately, one-third volume of water is added and the pH dropped to about 2.5 to 3.5 with sulfuric acid. The thus-obtained butanol-water solution is concentrated under reduced pressure at about 30° C. until the butanol phase is removed. The aqueous concentrate may be recycled by adding to the aqueous methanol solution of a succeeding run and the mixture worked up as previously described.

The following examples are given by way of illustration only and are not to be considered as limitations of the scope of this invention.

*Example I*

Twenty gallons of fresh, whole tetracycline fermentation broth having an activity of 245 million units (m.u.) is acidified to pH 2.0 with 50% sulfuric acid and then treated with 24.5g sodium ferrocyanide decahydrate. The acidified broth is filtered on a rotary press and the wash cycle so adjusted that the combined filtrate and wash volume is 10% greater than the volume of the starting broth. The mycelium is repulped at the same pH with water equivalent to ⅓ the volume of the starting broth, then filtered and washed in the manner described.

After addition of 3% w./v. diatomaceous earth filter aid, the pH of the combined filtrates and washings is adjusted to 8.5-8.8 with 25% sodium hydroxide, 0.5 ml. Arquad C-50 is added per million units of activity and the mixture filtered through a plate and frame press. The tetracycline-Arquad cake is washed with a volume of water equal to ¹⁄₁₀ the volume of the filtrate, after which the press is blown with air.

A kilogram of the wet filter cake, containing about 70-75% water, is transferred to a 2 liter beaker equipped with stirrer, and 200 ml. each of methanol and water are added. The slurry is stirred, and the pH adjusted to about 1.0-1.2 by the addition of 50% w./v. sulfuric acid. After stirring for about 30 minutes at 25° C. to insure complete solution of the tetracycline, the mixture is filtered through paper precoated with 30 grams filter aid. The filter cake is washed with a small quantity of water and the filtrate and wash combined to yield a clear solution having a potency of about 75,000 units tetracycline activity per ml.

Urea is now added at a level of 9 grams per million units of tetracycline activity (about 66 equivalents urea per tetracycline equivalent), and the solution is adjusted to a pH of about 4.2-4.4 by the addition of 25% w./v. aqueous sodium hydroxide. Golden yellow crystals of tetracycline urea form and are separated by filtration. The product has an ash content of 0.14% and a melting point (capillary) of 126-127° C.

The wet tetracycline-urea compound is converted to tetracycline base by dissolving in a mixture of water:ethyl Cellosolve:n-butanol (70:15:15) at pH 1.4 with sulfuric acid (50%) to give an activity of about 110,000 u./ml. Darco G-60 (100 gms./b.u.) is added, the mixture stirred for one-half hour, filtered and the filter cake washed with the same solvent system until the combined filtrate and wash is about 90,000 u./ml. The batch is adjusted to pH 3.3-3.5 with 25% sodium hydroxide and stirred for 3 hours at 25-27° C. with continuous pH checks. The base is removed by centrifugation, washed with water and dried in vacuo at 58-60° C. The recoveries realized in the various steps of this process are given below.

Process step: Percent yield
    From whole broth to aqueous methanol solution__ 78
    From methanol solution to tetracycline urea____ 81
    From tetracycline urea to tetracycline base_____ 95
    Overall yield_____ 67

One hundred grams of the dried tetracycline base is converted to the hydrochloride salt by dissolving in a 1:2 ethyl Cellosolve:n-butanol solution (600 ml.) at pH 7.8-8.0 with triethylamine. Darco G-60 (equivalent to 10% the weight of tetracycline base) is added, the mixture stirred for one-half hour, then filtered and washed with 400 ml. n-butanol. The pH is adjusted to 1.6-1.7 with hydrochloric acid at 25° C., and the mixture is seeded and allowed to granulate for 20 hours. The hydrochloride salt is removed by centrifugation, washed with n-butanol (100 ml.) followed by acetone (100 ml.) and dried in vacuo at 55-58° C.; step yield is 95% (64% overall yield from broth). The product is highly active against a variety of microorganisms and is identified by its characteristic properties.

*Example II*

A second kilogram portion of the wet tetracycline filter cake obtained in Example I from filtered broth is processed as described in that example. However, this time the urea level employed is reduced to 5 grams per million units tetracycline activity (about 37 equivalents urea per equivalent of tetracycline). Yellow-brown tetracycline urea compound, having an ash content of 0.3% and a melting point of 133-137° C., is obtained. The product is further processed to tetracycline base and hydrochloride as described in Example I. Recoveries realized in the various steps are appreciably poorer than those of Example I.

Process step: Percent yield
- Whole broth to aqueous methanol_____ 78
- Tetracycline urea_____ 85
- Tetracycline base_____ 80
- Tetracycline hydrochloride_____ 80
- Overall yield_____ 42

Example III

Example II is repeated, this time at a urea level of 3 grams per million units tetracycline activity (about 22 equivalents urea per equivalent of tetracycline). Muddy brown tetracycline urea, having an ash content of 1.6% and a melting point of 142–145° C., is obtained. With further processing as before the following reduced step yields are realized.

Process step: Percent yield
- Whole broth to aqueous methanol_____ 78
- Tetracycline urea_____ 77
- Tetracycline base_____ 75
- Tetracycline hydrochloride_____ 80
- Overall yield_____ 36

Example IV

A kilogram of wet tetracycline filter cake (about 75% $H_2O$), obtained from filtered broth as described in Example I, is slurried in a mixture of 200 ml. water and 500 ml. methanol and the tetracycline is solubilized by acidification as before. Aliquots of the filtered solution are taken and converted to tetracycline urea as described in Example I, with the exception that urea levels of 50 and 75 equivalents per tetracycline equivalent are employed in place of the level of the earlier example. Good quality tetracycline urea is obtained in each case, and it is converted to purified tetracycline base and hydrochloride in favorable yield.

Example V

The procedure of Example I is repeated in a series of experiments, using 0.25 g. portions of n-hexylamine, decylamine, octadecylamine, diheptylamine, dodecyltrimethylammonium chloride, octyltrimethylammonium chloride and octadecyltrimethyl ammonium chloride, per million units of tetracycline, in place of Arquad C–50. Good yields of tetracycline urea and tetracycline base and hydrochloride are obtained in each case.

Example VI

The procedure of Example I is repeated, except that this time the addition of Arquad C–50 or other organic base is entirely omitted. Tetracycline base is precipitated at pH 8.5–8.8 in about 5% lower yield than in the earlier example and successfully processed in good yield through the urea compound to purified base and hydrochloride, exactly as before.

Example VII 5 gallons of an aqueous tetracycline solution, prepared by catalytic reduction of chlortetracycline and having an activity of 10,000 u./ml., is worked up as described in Example I to give favorable yields of good quality tetracycline urea, base and hydrochloride.

What is claimed is:

1. The process which comprises dissolving tetracycline compound selected from the group consisting of tetracycline and tetracycline organic-base salt of a base selected from the group consisting of primary and secondary alkylamines containing from 6 to 18 carbon atoms and quaternary trimethyl ammonium compounds containing one alkyl group of 8 to 18 carbon atoms and urea in aqueous methanol to obtain a solution of a pH of from about 1 to about 1.8 at a temperature below about 27° C. having at least about 30,000 units of tetracycline activity per milliliter, from about 50 to about 75 equivalents of urea per equivalent of tetracycline and from about 10 to about 35% by volume of methanol, adjusting the pH of said solution to from about 4.0 to about 5.0 whereupon a tetracycline urea compound precipitates and separating precipitated tetracycline-urea compound from said aqueous methanol solution.

2. The process of claim 1 including the step of recovering said tetracycline from said separated tetracycline-urea compound.

References Cited in the file of this patent

UNITED STATES PATENTS 2,905,662   Smith et al. _____ Sept. 22, 1959

FOREIGN PATENTS 215,816   Australia _____ June 30, 1958
821,309   Great Britain _____ Oct. 7, 1959

OTHER REFERENCES

Smith et al.: Journal of Organic Chemistry, vol. 23, pages 721–4 (1958).